United States Patent [19]

Lignell

[11] 4,229,388

[45] Oct. 21, 1980

[54] LIQUID DISTRIBUTION SYSTEM FOR CONTACT BODIES AND THE LIKE

[75] Inventor: Håkan Lignell, Handelsvägen, Sweden

[73] Assignee: Aktiebolaget Carl Munters, Sollentuna, Sweden

[21] Appl. No.: 935,862

[22] Filed: Aug. 22, 1978

[30] Foreign Application Priority Data

Aug. 31, 1977 [SE] Sweden .............................. 7709810

[51] Int. Cl.³ .............................................. B01F 3/04
[52] U.S. Cl. .................................. 261/111; 261/112; 239/524
[58] Field of Search ............... 239/275, 500, 505, 512, 239/515, 518, 524, 547; 261/DIG. 11, 98, 111, 112

[56] References Cited

U.S. PATENT DOCUMENTS

| | | | |
|---|---|---|---|
| 1,180,870 | 4/1916 | Nabstedt | 239/524 X |
| 1,571,616 | 2/1926 | Backherms | 239/524 X |
| 1,647,281 | 11/1927 | Doyle | 261/DIG. 11 |
| 1,747,288 | 2/1930 | Coffey | 261/DIG. 11 |
| 2,628,865 | 2/1953 | Duncan, Jr. | 239/547 X |
| 2,639,947 | 5/1953 | Tramm et al. | 239/500 |
| 3,143,581 | 8/1964 | Walter | 261/111 |

FOREIGN PATENT DOCUMENTS

| | | | |
|---|---|---|---|
| 1263645 | 5/1961 | France | 239/547 |
| 18426 | of 1906 | United Kingdom | 261/DIG. 11 |
| 9985 | of 1910 | United Kingdom | 239/498 |

*Primary Examiner*—Robert W. Saifer

[57] ABSTRACT

A spraying system for distributing liquid over a contact body in biological filter beds, cooling towers and the like includes means for supplying and distributing the liquid over the surface of the contact body. The distributing means includes a liquid distribution pipe, at least one spray nozzle associated with the pipe and a sprayer for spreading the liquid discharged from the nozzle onto the surface of the contact body. The distributing pipe and nozzle are disposed below the sprayer and the sprayer consists of a conically shaped surface facing the nozzle so that liquid from the nozzle strikes the conical surface and is spread over the surrounding area of the contact body. Preferably the conical surface includes projections formed thereon for distributing the liquid in a predetermined pattern.

7 Claims, 3 Drawing Figures

LIQUID DISTRIBUTION SYSTEM FOR CONTACT BODIES AND THE LIKE

The present invention relates to a spraying system for distribution of liquid, especially for biofilter beds, cooling towers etc., comprising pipes for supply of the liquid and distribution thereof over a surface and at least one nozzle and one conically shaped deflector arranged in relation to the nozzle as to spread the liquid.

In operation of plants of the foregoing type for treatment of liquid or water, such as biofilter beds, cooling towers etc., it is of great importance for optimal efficiency that the liquid, the water etc. to be cooled, purified or otherwise treated, be given even distribution over the surface. For this purpose, there is in known applications a tube system or piping erected in spaced relation above the surface upon which liquid is to be distributed, which piping comprises main and branch tubes and nozzles or sprayers disposed with even spacing from one another above the surface upon which the liquid is to be distributed. To attain even spreading of the liquid over the surface there is required a great number of nozzles or sprayers which in turn results in a great number of branch tubes which renders the entire piping very extensive and voluminous and simultaneously requires a strong framework for supporting the piping. The even distribution of the liquid involves also that using nozzles with known spraying angles one has to arrange the piping relatively high above the surface upon which liquid is to be distributed because otherwise an excessive number of nozzles must be arranged tightly adjacent one another. This requirement substantially increases the overall height of the whole plant, while at the same time the liquid to be distributed must be raised to a greater level which calls for a higher pumping effort.

The main object of the invention is, therefore, to provide a spraying system for distribution of liquid over an underlying surface, especially for cooling towers, biofilter beds etc., which spraying system eliminates the above-mentioned drawbacks.

This is accomplished by the spraying system according to the invention which is characterized by the fact that distributing pipes and nozzles are disposed below a conically funnel-shaped deflector in such a manner that the liquid is splashed upwards and strikes against the conical underside of the deflector, said underside in addition preferably being formed so as to govern the distribution of the liquid over the surrounding surface.

In this way extremely important advantages are obtained in comparison with known spraying systems as described above. Thus, the piping may be placed directly on the surface of the contact body in the cooling tower or the biofilter bed, whereby framework or other support members for the piping are eliminated. Since in consequence thereof no ultimate bearing resistance is required in the tube system this system can be made of thinner and cheaper material and even of material which in itself actually has no ultimate bearing capacity at all, such as plastics etc. Due to the fact that the nozzles or holes in the pipes of the spraying system are directed upwards the risk of interruptions by clogging in the system is diminished, and, in addition, the holes can be made larger and be used in a lesser number than hitherto which also reduces the risk of clogging. By placing the piping on the surface upon which liquid is to be distributed, such as a bed or the like, also the lifting height for the liquid is reduced which involves saving of energy.

Other advantages and characteristics of the invention will become apparent from the following description in connection with an embodiment shown by way of example in the attached drawings.

Figure 1:
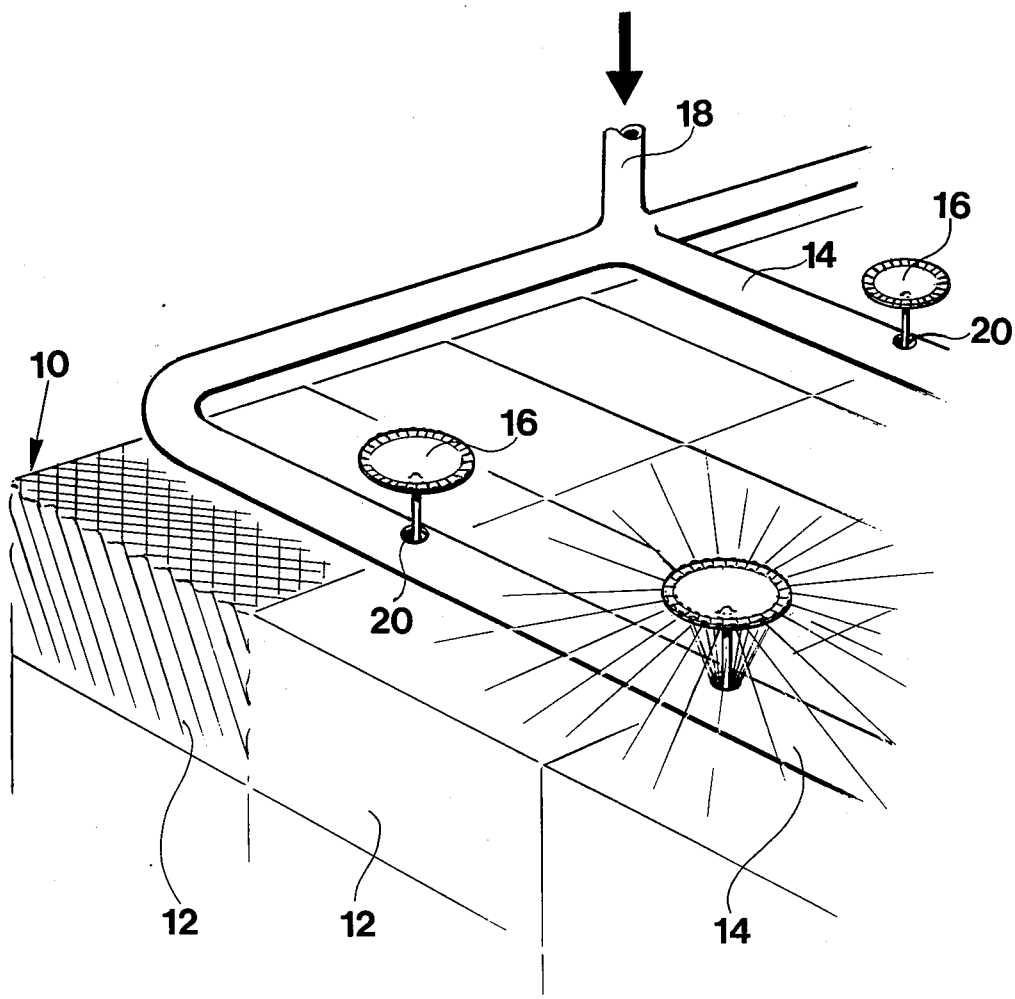
FIG. 1 is a perspective view of the top part of a biological filter bed upon which sewage is to be distributed and which is provided with the spraying system built according to the invention.

In the embodiment illustrated in FIG. 1, which relates to a biological filter bed, a contact body 10 formed by a plurality of unit or inserts 12 is shown, which unit or inserts in known manner consist of thin layers which all are folded or corrugated and positioned vertically and thus between themselves form channels extending from end to end from the top of the contact body 10 to the bottom thereof, in which channels water and air flow in direct contact with one another. Even through the shown embodiment relates to a biofilter bed, it is clear that the invention is applicable also to other fields with the same principal structural design and/or function, such as cooling towers etc.

To attain highest efficiency in such contact bodies it is essential that the supplied liquid be spread evenly over the top surface of the contact body before it flows into the same to contact the air coming from below. To this end, there is provided, according to the invention, a piping above the contact body, said piping comprising pipes 14 which are placed so as to rest directly on or, if desired, over parting agents on the surface of the contact body, and a number of deflectors 16 are arranged to cooperate with the pipes. The pipes 14 are connected to a feed duct 18 for supply of liquid, which in the shown embodiment is sewage or waste water.

Figure 2:
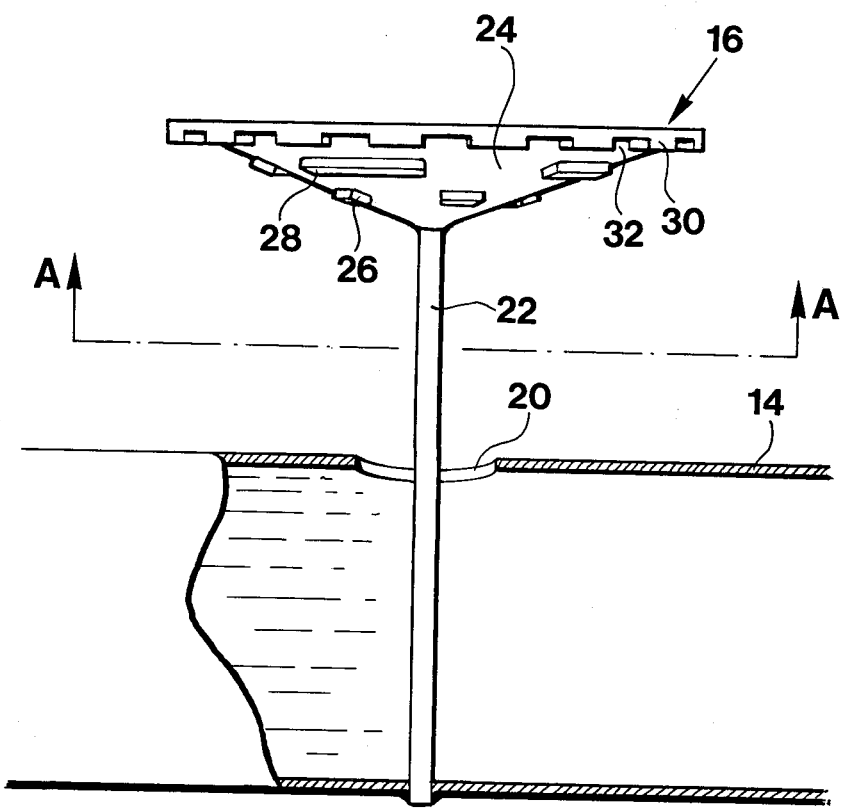
FIG. 2 shows a longitudinal section through a distributing pipe with a deflector disposed over said pipe.
Figure 3:
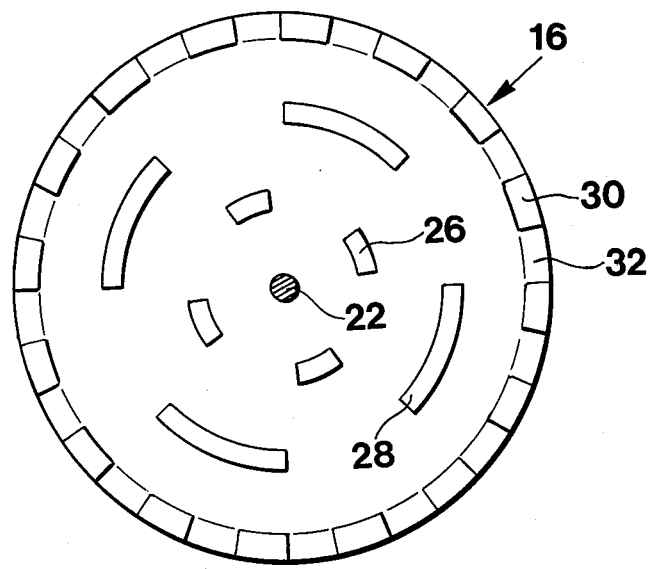
FIG. 3 is a view taken along line A—A in FIG. 2.

As is seen in more detail from FIG. 2, the pipes 14 are formed with discharge nozzles in the shape of holes 20 which are arranged around a deflector 16 which latter consists of a shank 22 by means of which the deflector 16 is supported in the tube 14, and a funnel-shaped top portion or distributor plate 24 positioned with appropriate spacing from the discharge hole 20. The liquid streaming through the nozzle or hole 20 will be splashed upwards and strike against the conical underside of the deflector 16 and become spread over the nearest surrounding surface of the contact body 10. In this way with an appropriate number of tubes 14 and deflectors 16 an even distribution of the water over the top surface of the bed will be obtained. To guide the escaping splash of water, the underside of the deflector 16 most suitably is formed in a specific manner. For example, the edge of the deflector 16 may be formed with recesses which cause the water to leave the sprayer at varying distances from the centre thereof. In the shown embodiment, however, the distribution is effected by means of projections formed both on the underside of the deflector 16 and at the edges thereof. Thus, in the shown embodiment, as is evident from FIG. 3, a number of, such as four, projections 26 which extend over an angle of the conical surface of between about 25° and 35° are situated at a predetermined distance from the center of the deflector, while an additional four projections 28 of which each extends over an angle of about 45°, are situated at a somewhat greater distance from the centre of the sprayer in the interspaces left between the inner projections 26. The splash of water striking against the inner projections 26 will thus be broken away from the surface of the deflector 16 down towards the contact body 10 at a distance nearer to the hole 20 than that water which strikes against the outer projections 28. In addition, there may be arranged around the outer edge of the deflector projecions 30 evenly spaced about said edge and alternating with depressions 32 constituting continuations in horizontal direction of the conical surface of the deflector 16. The projections 30 may, for example, have a height of 2 mms as well as the projections 26, 28 on the underside of the sprayer, and the breadth of the projections 26, 28 may be 4 to 6 mms.

Of course, the shown arrangement of projections is an example only of realization of the invention, and the deflector surface may be formed in some other way for even distribution of the water from the center of the sprayer and out over the surrounding surface.

With the spraying system according to the invention one obtains, as stated already by way of introduction, many advantages over the known constructions. The piping can be placed directly on the bed material and can be made of plain and cheap materials, such as plastics as PVC, for example, since no spans are to be encountered by the pipe 14 nor is it necessary to take its capacity for self-support into consideration. Suspension systems for pipes 14 and deflectors 16 can be dispensed with also. By placing the piping directly on the bed 10, the lifting height for the liquid is reduced by about 0.6 to 1 m as compared with the known construction, which involves a saving of energy required for pumping. A fewer number of holes 20 and deflector 16 is required, it being possible also to make the nozzle holes 20 larger than in known systems, which reduces the danger of clogging which is minor also because the holes are directed upwards. Due to the specific shape of the distributor plate 24 the required pressure drop across each hole 20 can be reduced which involves saving of energy, and with a predetermined pressure drop the spreading effect becomes greater than attained with conventional sprayers.

Obviously, the invention is not limited to the shown and described embodiment, but may be varied in the widest sense within the scope of the basic idea thereof and the accompanying claims.

I claim:

1. A spraying system for the distribution of liquid over the upper surface of a contact bed which is formed of a plurality of thin layers of vertically positioned folded and corrugated sheet material that is adapted to promote contact between said liquid and a gas flowing through said bed, said system comprising in combination with said bed at least one liquid distribution pipe seated on and supported by the upper layers of said bed defined by the upper edges of said layers of sheet material and having at least one liquid flow opening in the top thereof and a deflector plate positioned above said opening and having a generally conical lower surface confronting said liquid flow opening to promote distribution of said liquid over said surface of said bed.

2. A spraying system for the distribution of liquid over the upper surface of a contact bed which is formed of a plurality of thin layers of vertically positioned folded and corrugated sheet material that is adapted to promote contact between said liquid and a gas flowing through said bed, said system comprising in combination with said bed a liquid supply header, a plurality of branch distribution pipes connected to said header and seated on and in supporting contact with said upper surface of said contact bed defined by the upper edges of said layers of sheet material, said branch pipes having a plurality of liquid flow openings in the tops thereof and deflector plates positioned above said liquid flow openings and having generally conical lower surfaces confronting said liquid flow openings to promote distribution of said liquid over said surface of said bed.

3. A spraying system for distribution of liquid over a liquid/gas contact body which is formed of a plurality of thin layers of vertically positioned folded and corrugated sheet material comprising in combination at least one liquid distribution pipe supported on the upper surface of said contact body and having at least one liquid flow opening in the top thereof and a deflector plate positioned above said opening and having a generally conical lower surface confronting said liquid flow opening, said deflector plate being monted on a supporting shaft that extends downwardly through said opening in said distribution pipe, said shaft being secured to the bottom of said pipe and otherwise unsupported between the bottom of the pipe and the deflector plate.

4. A spraying system for distribution of liquid over a liquid/gas contact body comprising in combination at least one liquid distribution pipe having at least one liquid flow opening in the top thereof and a deflector plate positioned above said liquid flow opening and having a generally conical lower surface confronting said opening, the conical surface of said deflector plate being provided with a plurality of spaced elongated deflector members extending circumferentially around said conical surface and positioned to deflect a stream of liquid flowing through said opening and impinging on said deflector plate.

5. A spraying system according to claim 4 wherein the conical surface of said deflector plate is provided with a plurality of series of spaced elongated deflector members extending circumferentially around said conical surface, said series being located at different distances from the center of said deflector plate.

6. A spraying system according to claim 5 wherein said deflector plate is provided with two of said series and the deflecor members of each series are radially aligned with the spaces between adjacent members of the other series.

7. A spraying system for distribution of liquid over a liquid/gas contact body having a substantially horizontal upper surface comprising in combination a liquid supply header, a plurality of branch distribution pipes connected to said header and in supporting contact with said upper surface of said contact body, said branch pipes having a plurality of liquid flow openings in the tops thereof and deflector plates positioned above said liquid flow openings and having generally conical lower surfaces confronting said liquid flow openings, the conical surfaces of each deflector plate being provided with a plurality of spaced elongated deflector members extending circumferentially around said conical surface and positioned to deflect a stream of liquid flowing through said opening and impinging on said deflector plate.

* * * * *